United States Patent
Mishra et al.

(10) Patent No.: US 10,628,662 B2
(45) Date of Patent: Apr. 21, 2020

(54) AUTOMATED AND UNSUPERVISED CURATION OF IMAGE DATASETS

(71) Applicant: International Business Machines Corporation, Armonk, NY (US)

(72) Inventors: Chetan Mishra, New York, NY (US); Yun Zhai, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 15/909,243

(22) Filed: Apr. 5, 2018

(65) Prior Publication Data
US 2019/0311182 A1 Oct. 10, 2019

(51) Int. Cl.
  *G06K 9/00* (2006.01)
  *G06K 9/66* (2006.01)
  *G06K 9/62* (2006.01)

(52) U.S. Cl.
  CPC ..... *G06K 9/00288* (2013.01); *G06K 9/00228* (2013.01); *G06K 9/623* (2013.01); *G06K 9/6218* (2013.01); *G06K 9/66* (2013.01)

(58) Field of Classification Search
  CPC ........................... G06T 13/40; G06T 2200/24
  USPC ..................... 382/118, 128, 131, 162, 197
  See application file for complete search history.

(56) References Cited

U.S. PATENT DOCUMENTS

| | | | | |
|---|---|---|---|---|
| 8,055,065 B2* | 11/2011 | Allen | ................ | G06T 9/20 382/162 |
| 8,391,611 B2* | 3/2013 | Engtrom | ................ | G06F 16/58 382/197 |
| 8,553,037 B2* | 10/2013 | Smith | ................ | G06T 13/40 345/473 |
| 8,693,746 B2* | 4/2014 | Ishii | ................ | A61B 6/032 382/128 |
| 9,558,550 B2* | 1/2017 | Klauschen | ................ | G06K 9/4642 |
| 9,704,043 B2* | 7/2017 | Schnittman | ................ | B25J 5/00 |
| 10,223,788 B2* | 3/2019 | Bozorgtabar | ................ | G06T 7/0012 |
| 10,238,368 B2* | 3/2019 | Mullick | ................ | G06T 7/41 |

(Continued)

OTHER PUBLICATIONS

Hong-Wei Ng and Stefan Winkler, "A Data-Driven Approach to Cleaning Large Face Datasets," ADSC, University of Illinois at Urbana-Champaign, Singapore, 5 pages. [Accessed online Mar. 1, 2018] http://vintage.winklerbros.net/Publications/icip2014a.pdf.

(Continued)

*Primary Examiner* — Charlotte M Baker
(74) *Attorney, Agent, or Firm* — Patterson + Sheridan, LLP (57) ABSTRACT

Datasets containing a plurality of images are processed. A plurality of regions within the images are determined, where each of the plurality of regions corresponds to a facial region. A feature vector is generated for each of the plurality of pixel regions, and the plurality of pixel regions are clustered into a plurality of clusters based on the generated feature vectors. An initial score is assigned to each respective pixel region in the plurality of pixel regions, and the plurality of pixel regions are sorted based on the assigned scores. A representative index is computed for each respective pixel region by comparing each respective pixel regions with each other pixel region in the respective cluster. The score of each pixel region is modified based on the computed representative indices, and the pixel regions are sorted based on the modified scores. A confidence index is generated for the unified dataset.

20 Claims, 8 Drawing Sheets

(56) References Cited

U.S. PATENT DOCUMENTS

2012/0014578 A1* 1/2012 Karssemeijer ........ G06T 7/0012
                                                     382/131
2012/0294540 A1  11/2012 Sun et al.
2016/0371565 A1  12/2016 Krupka et al.

OTHER PUBLICATIONS

Arora et al., "Using High Performance Computing for Detecting Duplicate, Similar and Related Images in a Large Data Collection," First Online: Sep. 17, 2016, 6 pages, [Accessed Online Mar. 1, 2018] https://link.springer.com/chapter/10.1007/978-3-319-33742-5_13.

Otto et al.,"An Efficient Approach for Clustering Face Images," IEEE ICB 2015, 8 pages [Accessed Online Mar. 1, 2018] http://biometrics.cse.msu.edu/Publications/Face/OttoKlareJain_EfficientApproachClusteringFaceImages_ICB15.pdf.

Patil, et al,, "A Robust Face Annotation Method by Mining Facial Images," International Journal of Advanced Research in Computer Eniginnering & Technology (IJARCT), vol. 4, Issue 5, May 2015.

Sharma et al, "A Simple and Effective Technique for Face Clustering in TV Series," HCI, Karlsruhe Institute of Technology, 5 pages, [Acessed Online Mar. 1, 2018] <https://openreview.net/pdf?id=rJo-zOvgW>.

* cited by examiner

AUTOMATED AND UNSUPERVISED CURATION OF IMAGE DATASETS

BACKGROUND

The present disclosure relates to image storage, and more specifically, to processing datasets of images to improve coherence and reduce memory usage.

As used herein, an image dataset refers to a collection of images, stored in computer memory or storage. An image dataset may be stored, for example, using one or more databases. Image datasets can be utilized for any number of technologies and uses. For example, many image recognition algorithms depend on a voluminous data set of exemplar images that new images are compared to. In particular, many facial recognition methods need a significant number of pictures of the target individual, so as to ensure accurate and reliable identification. These datasets have continued to grow dramatically in size, resulting in increased computing resource usage including memory, storage, and processing power. In order to ensure that the database images are correct (i.e., that they show the correct target individual), current approaches require humans to verify each image. Otherwise, the image recognition system has no reliable dataset to compare received images to. As these image datasets have expanded, it has become impossible for human curation to satisfy these requirements.

Additionally, the number and variety of images in these datasets should be improved to reduce resource consumption. However, humans are incapable of the type of curation that facial recognition algorithms require. For example, two images may appear substantially identical to a human when they appear clearly distinct to computer methodologies. Culling such images leaves the recognition system with less data than it requires for reliable use. Similarly, images may appear distinct to a human operator while image recognition algorithms cannot distinguish between them. Leaving such images in the dataset requires additional storage, memory, and processing power, but does not improve the reliability of the system. Additionally, there is a need to better organize the data in image databases so as to reduce resource requirements in use. For example, the data should be stored such that the most relevant or reliable images are accessible easily and quickly. However, as above, humans are incapable of recognizing the aspects that image recognition algorithms depend on. As such, there is a need for an automated and unsupervised system for curating image datasets.

SUMMARY

According to one embodiment of the present disclosure, a method of processing a dataset containing a plurality of images is provided. The method includes determining a plurality of pixel regions within a plurality of images, wherein each of the plurality of pixel regions corresponds to a user facial region, and generating a feature vector for each of the plurality of pixel regions. The method further includes clustering the plurality of pixel regions into a plurality of clusters based on the generated feature vectors, such that each respective cluster comprises a respective subset of pixel regions from the plurality of pixel regions. An initial score is assigned to each respective pixel region in the plurality of pixel regions based at least in part on the cluster that the respective pixel region is associated with, and the plurality of pixel regions are sorted based on the assigned scores. Additionally, the method includes processing each cluster to create a unified dataset by, for each respective cluster in the plurality of clusters: computing a representative index for each respective pixel region in the respective subset of pixel regions associated with the respective cluster by comparing each respective pixel regions with each other pixel region in the respective subset of pixel regions, modifying the score of each respective pixel region based on the computed representative indices, and sorting the respective subset of pixel regions based on the modified scores. The method also includes generating a confidence index for the unified dataset based at least in part on a level of fragmentation in the unified dataset.

According to another embodiment of the present disclosure, a computer program product for processing a dataset containing a plurality of images is provided. The computer program product includes a computer-readable storage medium having computer-readable program code embodied therewith, the computer-readable program code executable by one or more computer processors to perform an operation. The operation includes determining a plurality of pixel regions within a plurality of images, wherein each of the plurality of pixel regions corresponds to a user facial region, and generating a feature vector for each of the plurality of pixel regions. The operation further includes clustering the plurality of pixel regions into a plurality of clusters based on the generated feature vectors, such that each respective cluster comprises a respective subset of pixel regions from the plurality of pixel regions. An initial score is assigned to each respective pixel region in the plurality of pixel regions based at least in part on the cluster that the respective pixel region is associated with, and the plurality of pixel regions are sorted based on the assigned scores. Additionally, the operation includes processing each cluster to create a unified dataset by, for each respective cluster in the plurality of clusters: computing a representative index for each respective pixel region in the respective subset of pixel regions associated with the respective cluster by comparing each respective pixel regions with each other pixel region in the respective subset of pixel regions, modifying the score of each respective pixel region based on the computed representative indices, and sorting the respective subset of pixel regions based on the modified scores. The operation also includes generating a confidence index for the unified dataset based at least in part on a level of fragmentation in the unified dataset.

According to another embodiment of the present disclosure, a system is provided. The system includes a processor and a memory storing one or more instructions which, when executed by the processor, performs an operation for processing a dataset containing a plurality of images. The operation includes determining a plurality of pixel regions within a plurality of images, wherein each of the plurality of pixel regions corresponds to a user facial region, and generating a feature vector for each of the plurality of pixel regions. The operation further includes clustering the plurality of pixel regions into a plurality of clusters based on the generated feature vectors, such that each respective cluster comprises a respective subset of pixel regions from the plurality of pixel regions. An initial score is assigned to each respective pixel region in the plurality of pixel regions based at least in part on the cluster that the respective pixel region is associated with, and the plurality of pixel regions are sorted based on the assigned scores. Additionally, the operation includes processing each cluster to create a unified dataset by, for each respective cluster in the plurality of clusters: computing a representative index for each respective pixel region in the respective subset of pixel regions associated with the respective cluster by comparing each respective pixel regions with each other pixel region in the respective subset of pixel regions, modifying the score of each respective pixel region based on the computed representative indices, and sorting the respective subset of pixel regions based on the modified scores. The operation also includes generating a confidence index for the unified dataset based at least in part on a level of fragmentation in the unified dataset.

DETAILED DESCRIPTION

Noisy and voluminous datasets can dramatically reduce the efficiency, reliability, and accuracy of image recognition systems. If the dataset includes too many inaccurate target images, the dataset is rendered useless for any subsequent use. Similarly, even assuming the images in the dataset are an accurate depiction of a target individual to be identified by facial recognition, it is desirable to include a wide variety of distinct images to improve the robustness of the system. At the same time, the number of images stored should be reduced to the extent practicable without harming reliability. Further, the way in which the dataset is organized and stored can have dramatic impacts on the efficiency of the system.

In an embodiment of the present disclosure, an image dataset or database can be populated by crawling data (e.g., crawling a plurality of websites on the Internet) to retrieve images that may include the target individual(s). However, facial recognition cannot be used to determine whether the retrieved images contain the target individual, as the required image database has not yet been constructed. In one embodiment, images are selected for inclusion in the dataset based on the associated text. For example, the nearby text, filename, and metadata may be parsed by one or more natural language processing (NLP) modules to search for the target individual's name or other identifying information (such as birthdate, location, occupation, and the like). In one embodiment, all such images are automatically retrieved and stored in an image database for use with a facial recognition system to identify the target individual.

However, the resulting dataset is likely to be highly noisy, meaning that it includes a relatively large number of images that are irrelevant to facial recognition, are too grainy, too blurry, or too low-resolution to be suitable. For example, a NLP crawler scraping the Internet for images of an individual named "John Doe" will likely also recover images that are not useful for facial recognition (e.g., pictures of John Doe's house, family, artwork, etc.). Similarly, the resulting dataset is likely to include a number of images that are entirely irrelevant (e.g., other people named John Doe). Furthermore, the resulting dataset may include the same image multiple times (e.g., retrieved from different web servers), or a number of images that appear very similar to an image recognition algorithm. Such a noisy dataset requires more computing resources than are required for reliable recognition, and may be inefficient. Embodiments of the present disclosure enable automated and unsupervised systems to curate the noisy dataset, as will be discussed in more detail below.

Additionally, the dataset should be organized so as to reduce the computing resources required to use it. For example, the dataset should be arranged so that the most relevant and reliable images are accessed first when performing facial recognition. As such, some embodiments of the present disclosure enable automated and unsupervised curation of image databases that includes improving the way the dataset is stored. In this way, image recognition technology is significantly improved, because it is made more reliable while utilizing fewer computing resources. Existing solutions cannot provide this functionality, as the optimal organization depends inherently on the way that computer algorithms process images, as opposed to how humans view them. Additionally, the operations of the computing device itself are improved because the image dataset is stored and processed in a more efficient manner.

Figure 1:
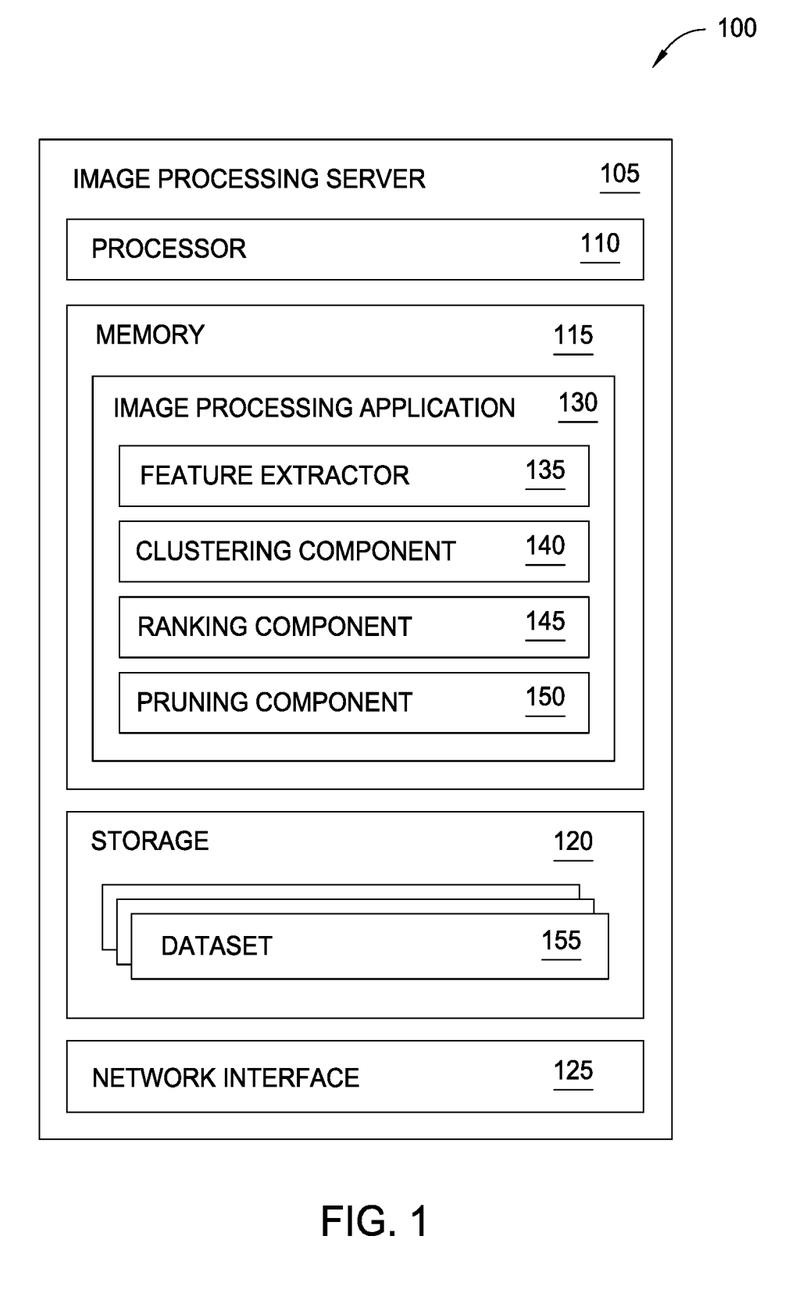
FIG. 1 illustrates a block diagram of a server configured to curate image databases, according to one embodiment disclosed herein.

FIG. 1 illustrates a block diagram of an Image Processing Server 105 configured to curate image databases, according to one embodiment disclosed herein. In the illustrated embodiment, the Image Processing Server 105 includes a Processor 110, Memory 115, Storage 120, and Network Interface 125. The Processor 110 may be one or more central processing units (CPU) and/or graphics processing units (GPU), each having one or more cores. Memory 115 is generally representative of random access memory. Storage 120 may represent a hard drive, solid state drive, storage area network, and the like. The Network Interface 125 is generally used to communicate across a local or wide network (e.g., the Internet).

In the illustrated embodiment, the Memory 115 includes an Image Processing Application 130. Storage 120 includes one or more Datasets 155. In an embodiment, each Dataset 155 represents a corpus or database of digital images associated with a particular image recognition target. For example, in a facial recognition embodiment, each Dataset 155 corresponds to a particular target individual. Such datasets may be obtained by, for example, scraping the Internet using one or more automated scripts or systems, as discussed above. In embodiments, when they are created, the Datasets 155 may be noisy and duplicative. The Image Processing Application 130 may be used to curate these Datasets 155 to improve organization, remove duplication, and the like. Such a curated or unified Dataset 155 is more computationally efficient, as well as more cohesive and better suited for use with image recognition systems.

As illustrated, the Image Processing Application 130 includes a Feature Extractor 135, a Clustering Component 140, a Ranking Component 145, and a Pruning Component

150. The operations of each module are described in more detail below. Generally, the Feature Extractor 135 is configured to identify faces in images (e.g., identify a facial region, or a region of pixels that includes a human face) and extract facial features from the identified pixel regions. In some embodiments, the face detection may be completed by a separate module from the Feature Extractor 135, or the Feature Extractor 135 may include two or more components within it to perform these operations. In some embodiments, the extracted facial features are represented by a high-dimension feature vector. For example, in one embodiment, the generated feature vector may include 256 dimensions. In other embodiments, each feature vector may include many more dimensions, such as 4,096 dimensions. Of course, feature vectors of any size may be utilized in various embodiments of the present disclosure.

In one embodiment, the Feature Extractor 135 includes one or more machine learning models or deep neural networks to extract facial characteristics and generate feature vectors. In some embodiments, in addition to facial features, the Feature Extractor 135 also extracts additional features of the image as a whole, such as color distribution, lighting, color correlogram, resolution of the facial region or entire image, orientation of the face, and the like. In various embodiments, these features may be represented as additional dimensions in the same feature vector as the facial landmark features, or in one or more separate feature vectors.

As illustrated, the Clustering Component 140 utilizes one or more clustering algorithms (e.g., iterative splitting, k-means, etc.) to generate clusters based on the generated feature vectors. In this way, each pixel region that is identified as containing a face or facial region is clustered with other identified regions based on how similar the faces are. In some embodiments, the Clustering Component 140 computes pair-wise similarity measures for each pair of identified pixel regions during this clustering process. In some embodiments, identical/duplicate images are identified (e.g., by comparing the generated pair-wise similarities) and pruned based on the generated feature vectors.

In some embodiments, pairs with sufficiently high similarity (e.g., with a determined similarity that exceeds a predefined threshold) are determined to be duplicative (i.e., near-duplicates), even if the images are not identical. For example, in one embodiment, the Clustering Component 140 or Pruning Component 150 compares the generated feature vectors (or the portion of the feature vectors that corresponds to the identified pixel regions) to generate a similarity measure. For example, one image may be a cropped version of the original image. By comparing only the identified pixel regions corresponding to faces, the Image Processing Application 130 can identify these duplicates and remove one of the images from the Dataset 155, thereby reducing the computing resources required to process and store the Dataset 155. Similarly, two pictures may be of the same person, but taken from differing angles, at differing locations, or at differing times, but still include similar depictions of the person's face. In an embodiment, the Image Processing Application 130 is configured to identify these near-duplicates and treat as duplicates, by removing the duplicates from the Dataset 155 based on the generated feature vectors.

In some embodiments, the generated clusters are passed to the ranking Component 145 for further processing. In some embodiments, however, the Clustering Component 140 further analyzes the generated feature vectors to determine whether any clusters should be merged. For example, depending on the clustering algorithm used, it is possible in some embodiments for identified pixel regions depicting the same individual to be split across multiple clusters. To remedy this, in an embodiment, the Clustering Component 140 merges similar clusters based on maximum inter-cluster similarity (e.g., as determined based on the generated feature vectors) by computing comparative indices indicating the pair-wise similarity between all pairs of identified pixel regions in two clusters. In one embodiment, if the highest comparative index of the pairs exceeds a predefined threshold, the clusters are merged. In a related embodiment, the clusters are merged if the aggregate comparative indices (e.g., the result of summing each pair-wise comparative index) exceed a predefined threshold.

The Ranking Component 145 generally scores and ranks each identified pixel region based on various factors. In an embodiment, the larger a cluster is, the higher weight its associated pixel regions are given. In one embodiment, once the clusters are finalized, the Ranking Component 145 assigns an initial score to each pixel region based on the number of total pixel regions that correspond to the associated cluster. That is, if a first identified region is associated with a cluster that includes 100 other identified regions, it will be assigned a higher initial score than an identified pixel region that is associated with a cluster containing 5 other identified facial regions. After assigning this initial score, in one embodiment the Ranking Component 145 sorts or ranks the pixel regions based on their scores. In this way, although the regions are not sorted within their respective clusters, all pixel regions associated with the largest cluster are first, followed by the second largest cluster, and so on.

In some embodiments, the Ranking Component 145 further scores and sorts identified pixel regions within each cluster based on how representative of the cluster each region is. For example, in one embodiment, the Ranking Component 145 may generate a representative index for each pixel region by computing pair-wise comparisons with each other region in the selected cluster (utilizing the generated feature vectors for each region). In some embodiments, rather than calculating each representative index, the Ranking Component 145 may utilize pair-wise comparisons calculated by another component, such as Clustering Component 140. In one embodiment, the representative index indicates how representative each pixel region is of the cluster as whole. For example, in one embodiment, the representative index of a region is the average of the pair-wise similarities with each other identified region in the cluster. In another embodiment, the representative index is the aggregate similarity measure (e.g., the summation of all of the pair-wise similarities/differences in the cluster). In some embodiments, the representative index for a particular pixel region is the maximum of the computed pair-wise similarities in the cluster (e.g., the highest calculated similarity).

In one embodiment, once representative indices have been generated for each identified pixel region in the cluster, the Ranking Component 145 sorts the regions based on these indices, and proceeds to the next cluster. In this way, the pixel regions associated with each cluster are sorted within their respective clusters based on how representative of their respective clusters they are. Thus, in an embodiment, the Ranking Component 145 generates a unified dataset including ranked and sorted pixel regions, each region corresponding to a detected face in one of the images in the Dataset 155. In some embodiments, the largest cluster is likely to contain images of the target individual, because the original noisy Dataset 155 is likely to include a relatively large number of pictures of the target individual as compared to any other cluster of images. However, in some embodiments, the Image Processing Application 130 continues to process each cluster, rather than only the first. For example, the remaining clusters may additionally include images of the target individual, but may be clustered separately because of hair-style, lighting, angle, and the like. However, these clusters contain useful information, and thus are still included in the final unified Dataset 155, in some embodiments.

In some embodiments, the Pruning Component 150 can analyze this unified Dataset 155 to further prune unnecessary duplication from the Dataset 155. For example, in many cases, images from similar settings (e.g., similar lighting, makeup, hair-style, and the like) may exist in the Dataset 155, even after the above pruning. In some aspects, these additional images do not provide any further useful data for the system. For example, if a query image matches with one of these images, it is very likely to match with the remaining similar images as well. Thus, in such an embodiment, the storage and deployment costs are not justified. In order to identify such images, the Pruning Component 150 may scan the ranked list of identified pixel regions.

In one embodiment, the Pruning Component 150 begins at the lowest ranked pixel region (e.g., the lowest scored region in the smallest cluster) and compares it to the next-highest region. For example, in various embodiments, this comparison may be accomplished by facial recognition matching, or by computing pair-wise similarity based on their respective feature vectors. If this comparative index exceeds a predefined threshold, the selected pixel region (e.g., the lower of the two regions) can be pruned and removed from the Dataset 155. In this way, the Dataset 155 has improved variety and reduced memory and storage requirements. Similarly, the resulting Dataset 155 requires fewer computing resources when used by image recognition systems.

In some embodiments, the Pruning Component 150 or Ranking Component 145 may also compare images or identified pixel regions between multiple Datasets 155. For example, in embodiments of the Image Processing Server 105 that maintain Datasets 155 for large numbers of people, it is likely that the same image(s) will be represented in more than one individual's Dataset 155. Such overlapping images contribute ambiguity to the facial recognition of individuals. In one embodiment, overlapping images are identified by comparing each image in a first Dataset 155 against all other images in all other Datasets 155 (e.g., by comparing the generated feature vectors for each image). If two images in disparate Datasets 155 are determined to be sufficiently similar, they are considered to be overlapping. In some embodiments, these overlapping images may be pruned from one or both Datasets 155. In some embodiments, the generated scores of pixel regions (e.g., faces) in both Datasets 155 are reduced, such that they are considered less relevant in their respective Datasets 155.

Similarly, in some embodiments, if two images from distinct Datasets 155 are processed and determined to be the same individual, their respective rankings in each Dataset 155 can be adjusted. For example, if the images or pixel regions are both ranked relatively highly in their respective Datasets 155, the score of both can be reduced to lower their influence. If the pixel region in a first Dataset 155 is ranked relatively highly, while the same pixel region is ranked relatively low in a second Dataset 155, the region in the second Dataset 155 may have its score reduced further (i.e., because it can be assumed that the associated image more likely depicts the individual represented by the first Dataset 155, rather than the second).

In some embodiments of the present disclosure, once a Dataset 155 has been processed, organized, and pruned, the Image Processing Application generates a confidence index for the Dataset 155. The confidence index is a measure indicating the cohesiveness of the Dataset 155, and can be used as a predictor for the quality or reliability of any resulting operations performed using the Dataset 155 (e.g., facial recognition algorithms). In some embodiments, the confidence index is generated based at least in part on the level of fragmentation in the Dataset 155. As used herein, the level of fragmentation refers to the size and number of clusters in the Dataset 155. For example, if the largest cluster is not much bigger than the remaining clusters, the Dataset 155 is highly fragmented. That is, if, for example, the largest cluster includes 50 pixel regions, the second-largest includes 42, and the third-largest comprises 38, the Dataset 155 is fragmented.

If, however, the largest cluster is significantly larger than the remaining clusters, the Dataset 155 is much less fragmented. Similarly, in some embodiments, the ratio between the size of the largest cluster and the total number of facial regions in the Dataset 155 is used to generate the confidence interval. For example, in some embodiments, if the largest cluster includes only ten percent of the total pixel regions, the generated confidence interval is likely to be close to zero. If, however, the largest cluster includes sixty percent or more of the total pixel regions in the Dataset 155, the confidence interval will be high (e.g., close to the maximum). In various embodiments, the confidence interval may range from zero to one, from zero percent to one hundred percent, or any other suitable range.

Figure 2:
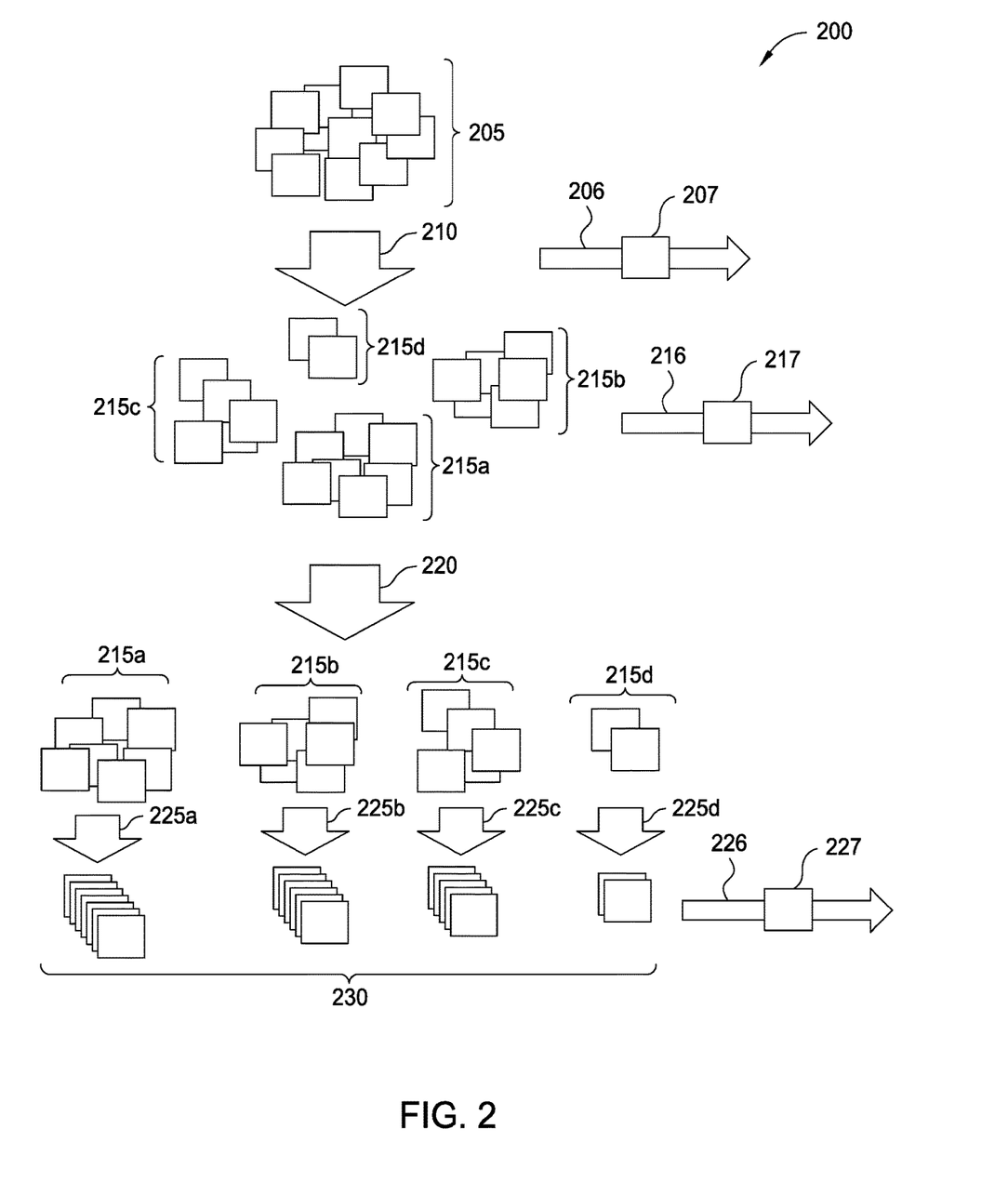
FIG. 2 illustrates a workflow for curating image databases, according to one embodiment disclosed herein.

FIG. 2 illustrates a workflow 200 for curating image databases, according to one embodiment disclosed herein. The illustrated workflow 200 begins with an unsorted Dataset 205. As indicated by arrow 210, the Dataset 205 is clustered into a number of Clusters 215a-d. For example, as discussed above, the Clustering Component 140 may generate each Cluster 215a-d based on the feature vectors generated by Feature Extractor 135. Further, as illustrated by arrow 206, at least one of the images 207 has been removed or pruned from the Dataset 205 during the clustering process (e.g., because no faces were detected in the image 207).

Furthermore, as illustrated by arrow 216, at least one pixel region 217 is removed from the dataset 205 during or after the clustering process, for example, because it is a duplicate or near-duplicate of another pixel region, as discussed above. Once the Clusters 215a-d have been created, the Ranking Component 145 assigns weights to each Cluster 215a-d, and assigns initial scores to each pixel region based on these weights, as discussed above. As illustrated by arrow 220, the Ranking Component 145 assigns each pixel region in Cluster 215a with the highest score because the Cluster 215a is the largest cluster. In the illustrated embodiment, the Clusters 215a-d are sorted from largest to smallest moving from left to right. The pixel regions in Clusters 215b-d are similarly scored in descending order, based on the descending number of pixel regions in each Cluster 215b-d.

Additionally, as illustrated by the arrows 225a-d, the pixel regions within each Cluster 215a-d are scored and sorted based on their representativeness of their clusters, as discussed above. Furthermore, as discussed above, in some embodiments, the pixel regions are sorted within each cluster based further on auxiliary factors including the orientation of the detected face, the resolution of the face, and the like. For example, pixel regions containing faces with high resolution looking directly towards the camera may have their scores increased, while pixel regions containing faces that are blurrier or angled away from the camera may have their scores reduced. As illustrated by arrow 226, one or more pixel regions 227 have been removed at this stage as well, for example because it was too similar to the immediately adjacent pixel region in the sorted list. Finally, after each of these operations, the unified Dataset 230 is created which comprises a ranked ordering of pixel regions, each representing an image of a face, from the highest-scored region down to the lowest scored region. After this unified Dataset 230 is created, a confidence index may be generated, as discussed above.

Figure 3:
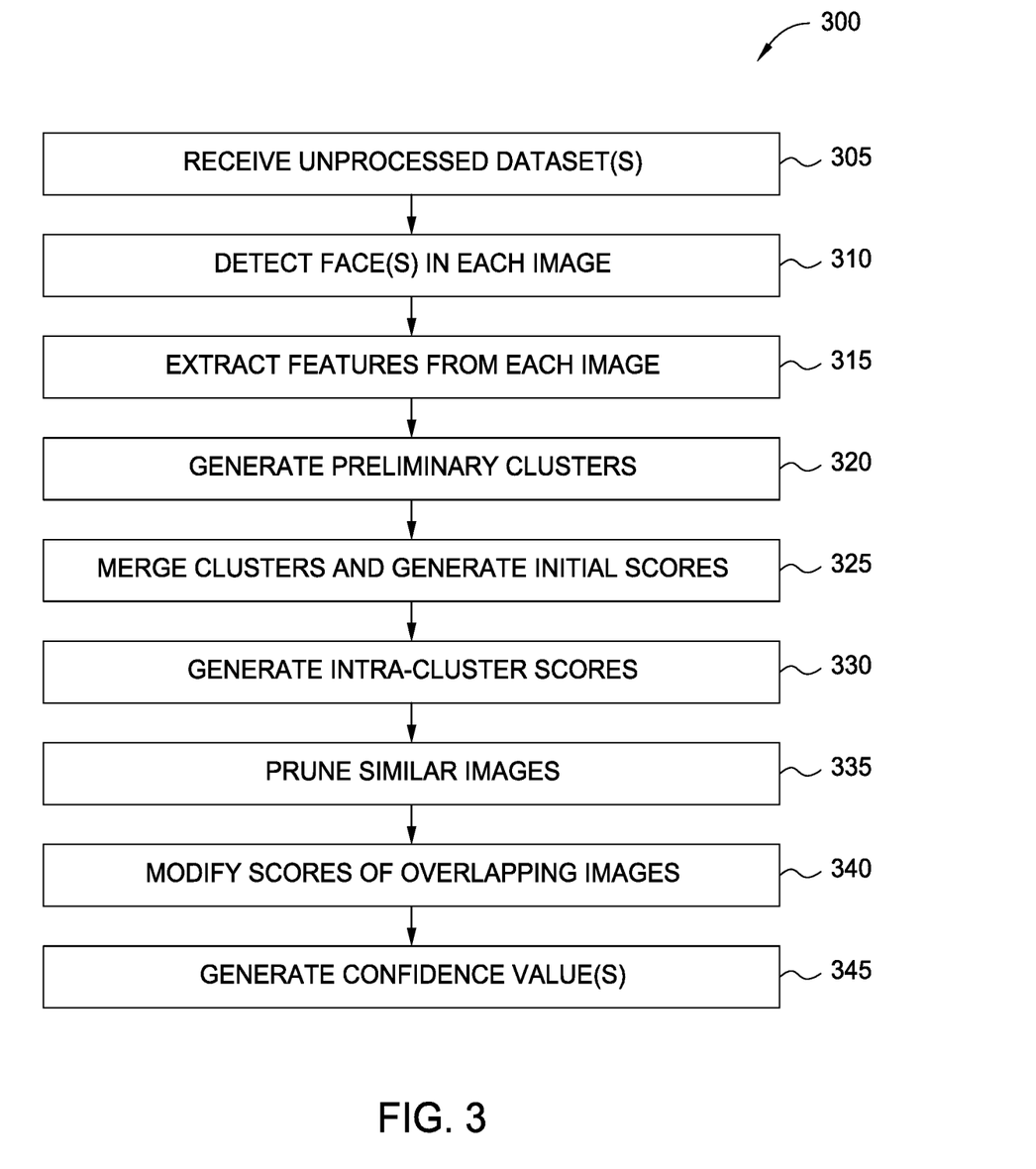
FIG. 3 is a flow diagram illustrating a method of organizing and processing images in a database, according to one embodiment disclosed herein.

FIG. 3 is a flow diagram illustrating a method 300 of organizing and processing images in a database, according to one embodiment disclosed herein. The method 300 begins at block 305, where the Image Processing Application 130 receives one or more Datasets 155 that need to be curated or processed. The method 300 proceeds to block 310, where the Feature Extractor 135 detects any faces present in each image, as discussed above. This block is also discussed in more detail below with regards to blocks 405, 410 and 415 in FIG. 4. The method 300 then proceeds to block 315, where the Feature Extractor 135 extracts features from each image (e.g., from each identified facial region) and generates feature vectors for each identified pixel region, as discussed above. This block is also discussed below with regards to blocks 420, 425, 430, and 435 in FIG. 4.

The method 300 continues to block 320, where the Clustering Component 140 generates preliminary clusters, as discussed above. This block is also discussed in more detail below with regards to blocks 440 and 445 in FIG. 4. The method 300 then proceeds to block 325, where the Clustering Component 140 and Ranking Component 145 merge any clusters that exceed a predefined threshold of similarity and generate initial scores for each pixel region, as discussed above. This block is further discussed below with respect to FIG. 5. At block 330, the Ranking Component 145 generates intra-cluster scores, as discussed above. That is, at block 330, the pixel regions are sorted within each cluster (as opposed to merely sorting the clusters). This operation is additional discussed below with regards to FIG. 6.

The method 300 then proceeds to block 335, where similar images are pruned by Pruning Component 150, as discussed above. This pruning operation is further discussed below with regards to FIG. 7. At block 340, the scores of overlapping images are modified or adjusted, as discussed above. That is, if images or pixel regions are found in more than one Dataset 155, the scores of the region in each Dataset 155 can be adjusted as discussed above. Finally, the method 300 proceeds to block 345, where the Image Processing Application 130 generates a confidence index for the Dataset 155, based on the fragmentation of the Dataset 155.

Figure 4:
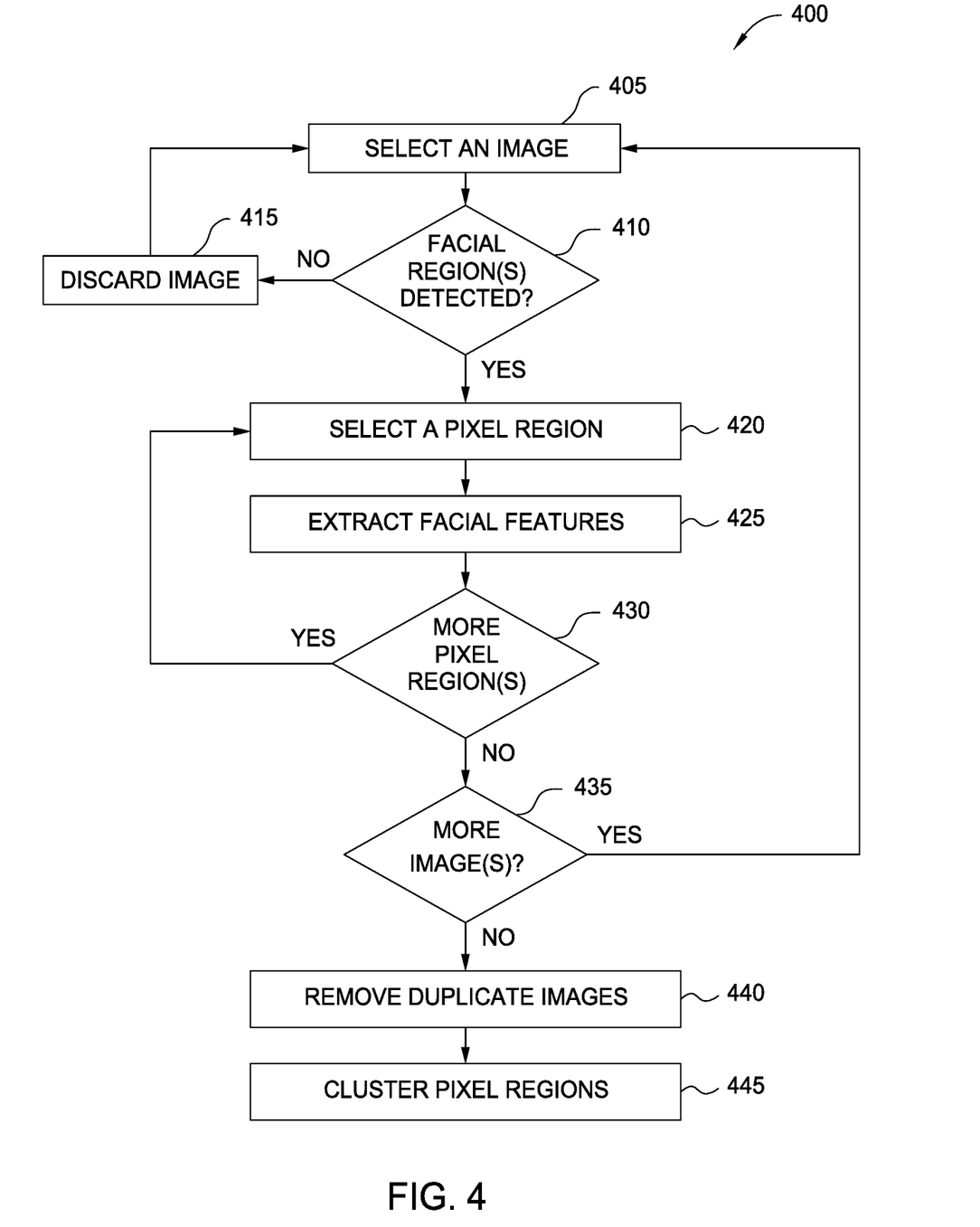
FIG. 4 is a flow diagram illustrating a method of organizing and processing images in a database, according to one embodiment disclosed herein.

FIG. 4 is a flow diagram illustrating a method 400 of organizing and processing images in a database, according to one embodiment disclosed herein. The method 400 begins at block 405, where the Feature Extractor 135 selects a first image in a Dataset 155. This image can be selected according to any methodology (including at random), as the Dataset 155 is in an effectively random order at this stage. At block 410, the Feature Extractor 135 attempts to detect any faces or facial regions in the selected image. That is, the Feature Extractor 135 identifies pixel regions in the image that include a human face. If no faces are detected at block 410, the method 400 proceeds to block 415, where the image is discarded. The method 400 then returns to block 405 to select another image that has not yet been processed by the Feature Extractor 135.

If at least one face is detected (i.e., at least one pixel region corresponding to a face is identified), the method 400 continues to block 420, where the first of these identified pixel regions are selected by the Feature Extractor 135. At block 425, the Feature Extractor 135 extracts facial features from the selected pixel region and generates a feature vector for the region. As discussed above, in some embodiments, this feature vector may additionally include dimensions relating to the overall image, such as color distribution. The method 400 then proceeds to block 430, where it is determined whether additional pixel regions were identified in the selected image (e.g., because there is more than one person in the image). If so, the method 400 returns to block 420 to select a next pixel region.

If there are no remaining pixel regions that have not been processed by the Feature Extractor 135, the method 400 proceeds to block 435, where it is determined whether there are additional unprocessed images in the Dataset 155. If so, the method 400 returns to block 405 to select a next image for processing. If not, the method 400 continues to block 440. At block 440, duplicate images are removed from the Dataset 155. For example, as discussed above, two images or pixel regions may be considered duplicative if they are identical. Additionally, in some embodiments, images or pixel regions are considered duplicative if they are not identical, but the generated feature vectors of each region are sufficiently similar (e.g., they are near-duplicates). For example, if a pairwise comparison of the feature vectors returns a difference below a predefined threshold (or a similarity above a predefined threshold), the regions are considered duplicates, and one of the regions is pruned. In some embodiments, the Image Processing Application 130 may determine which duplicate region to prune based on various factors, such as the resolution of each region, blurriness, angle of the face, and the like. The method 400 then continues to block 445, where the pixel regions are clustered based on their generated feature vectors, as discussed above.

Figure 5:
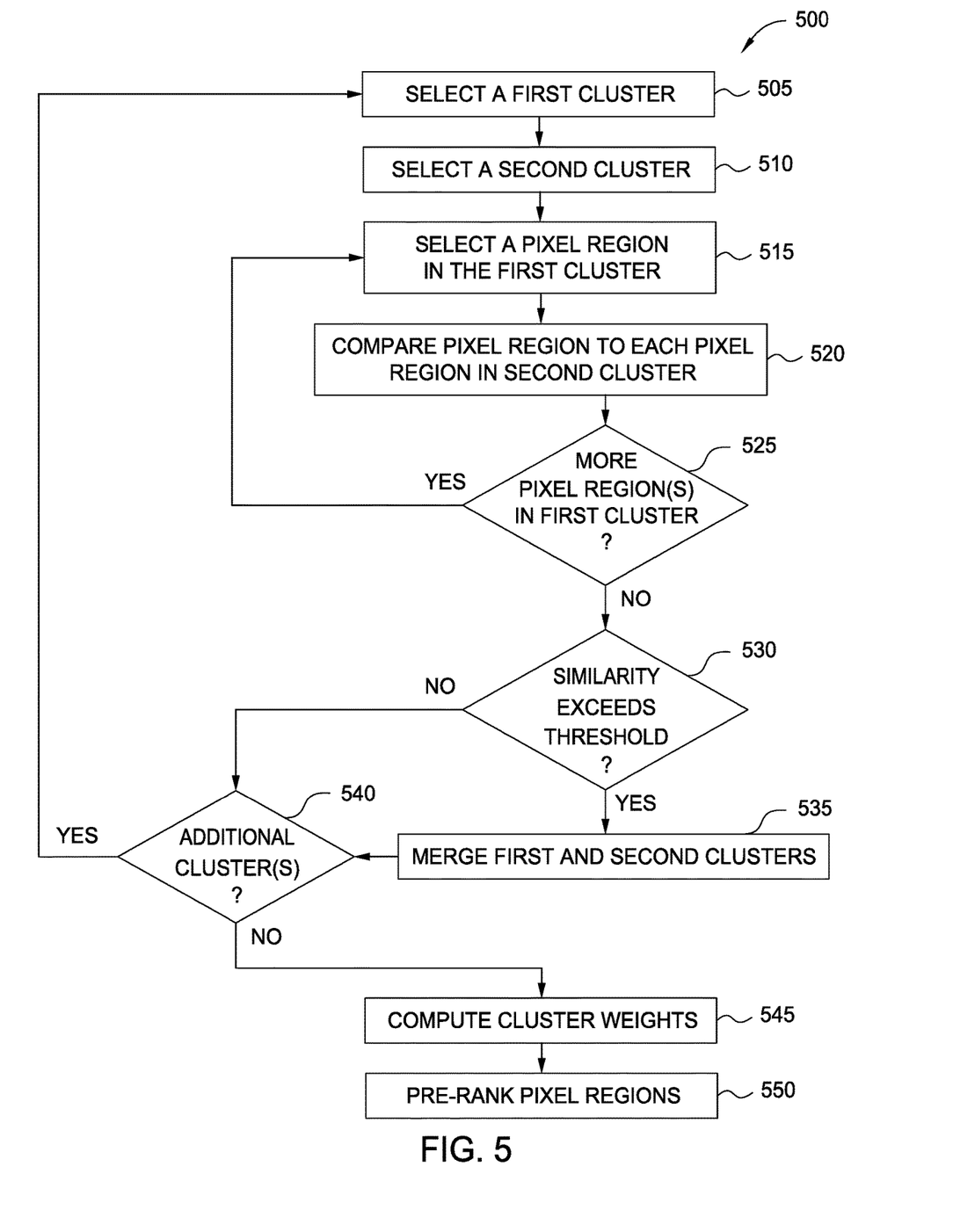
FIG. 5 is a flow diagram illustrating a method of organizing and processing images in a database, according to one embodiment disclosed herein.

FIG. 5 is a flow diagram illustrating a method 500 of organizing and processing images in a database, according to one embodiment disclosed herein. The method 500 begins at block 505, where a first cluster is selected by Clustering Component 140. At block 510, the Clustering Component 140 picks a second cluster. These clusters can be selected according to any number of methodologies, as each cluster will be compared with all other clusters in the Dataset 155. At block 515, the Clustering Component 140 selects a first pixel region in the first cluster. The method 500 then proceeds to block 520, where the Clustering Component 140 compares the selected pixel region to each pixel region in the second cluster, and generates comparative indices for each pair.

The method 500 continues to block 525, where it is determined whether there is at least one additional pixel region in the first cluster that has not yet been processed. If so, the method 500 returns to block 515 to select and process a new pixel region. If not, the method 500 proceeds to block 530, where the Clustering Component 140 determines whether the determined similarity between the clusters exceeds a predefined threshold. For example, as discussed above, this may be determined based on the maximum comparative index, the aggregate index, the average index, and the like. If the clusters are sufficiently similar, the method 500 proceeds to block 535, where the Clustering Component 140 merges the first and second clusters into a single cluster. The method 500 then continues to block 540.

Similarly, if the Clustering Component 140 determines that the similarity does not exceed the predefined threshold, the method 500 continues to block 540 where it is determined whether there are additional clusters remaining. That is, it is determined whether there is at least one pair of clusters that have not yet been compared. If so, the method 500 returns to block 505. If no additional cluster pairs remain, the method 500 proceeds to block 545, where the Clustering Component 140 computes cluster weights, as discussed above. For example, the Clustering Component 140 the cluster weight may be the normalized log of the cluster size. In this way, larger clusters are assigned more weight than smaller clusters. The method 500 then proceeds to block 550, where the Ranking Component 145 pre-ranks the pixel regions based on this cluster weight. Thus, the pixel regions are sorted relative to the other clusters according to their own clusters, but are not sorted within their clusters.

Figure 6:
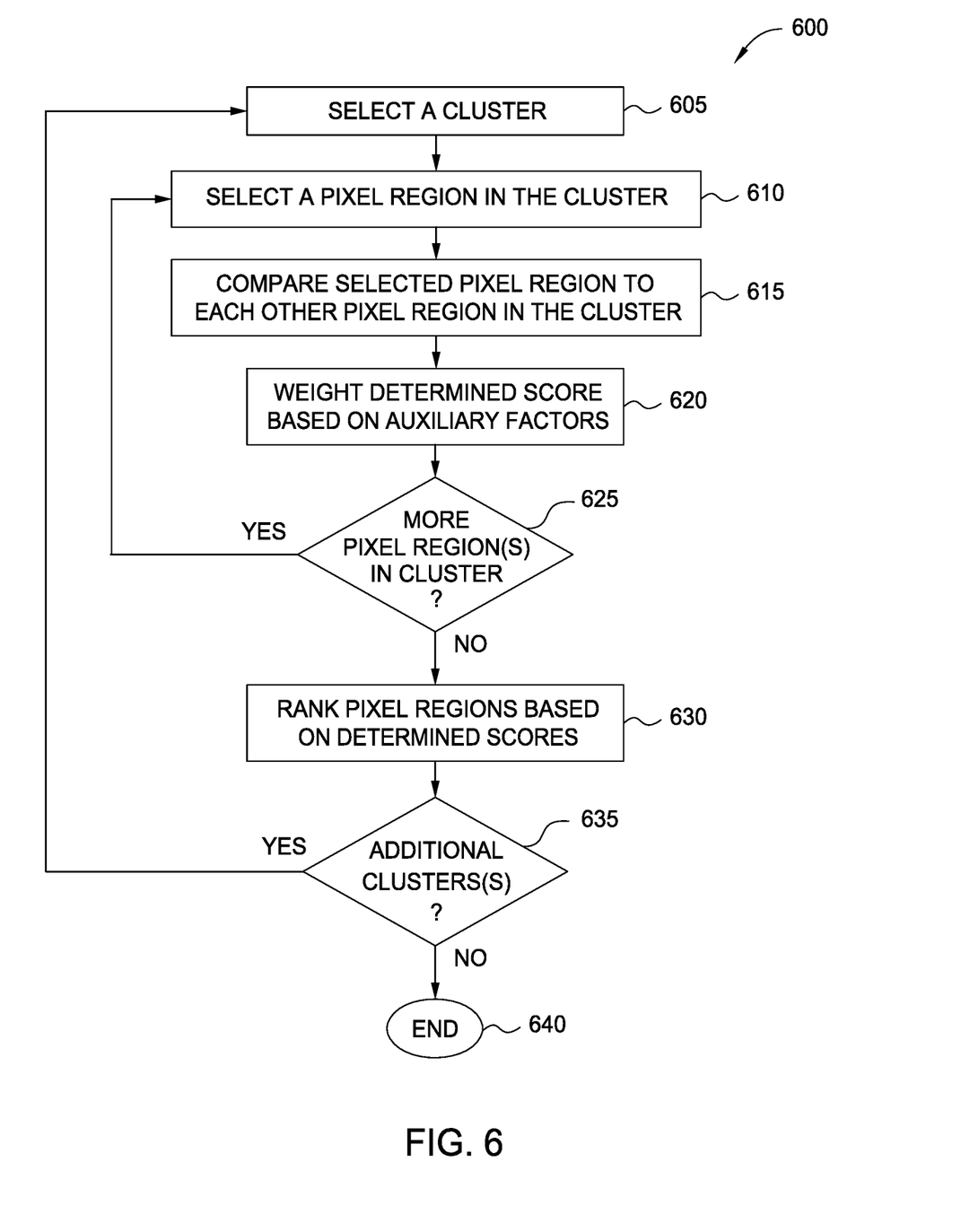
FIG. 6 is a flow diagram illustrating a method of organizing and processing images in a database, according to one embodiment disclosed herein.

FIG. 6 is a flow diagram illustrating a method 600 of organizing and processing images in a database, according to one embodiment disclosed herein. The method 600 begins at block 605, where the Ranking Component 145 selects a cluster 605. For example, the Ranking Component 145 may begin with the largest cluster. The method 600 then proceeds to block 610 where the Ranking Component 145 selects a first pixel region in the selected cluster. At block 615, the Ranking Component 145 generates representative indices for the selected region by comparing the selected pixel region to all other pixel regions in the cluster, utilizing pair-wise comparisons with each other region. For example, the Ranking Component 145 may compare the feature vectors for each region. Additionally at block 615, the Ranking Component 145 scores the selected pixel region based on these determined representative indices, as discussed above.

The method 600 then proceeds to block 620, where the selected pixel region's score is optionally adjusted by various auxiliary factors. As discussed above, these may include factors such as the face orientation, resolution, blurriness, and the like. Facial regions (e.g., pixel regions) with a frontal pose, larger resolution, and less blurriness may have their scores adjusted upwards. At block 625, the Ranking Component 145 determines whether there are additional pixel regions in the cluster that have not yet been processed. If so, the method 600 returns to block 610 to select a next region. In some embodiments, the pair-wise comparisons are recomputed for each pixel region again. In some embodiments, however, the comparison may be completed once for each pair of regions, such that the Ranking Component 145 can refer to this comparison for subsequent runs through the flow diagram.

If no additional pixel regions remain, the method 600 proceeds to block 630 where the Ranking Component 145 ranks or sorts the pixel regions based on their determined scores. In this way, the pixel regions (i.e., the faces) in the selected cluster are sorted based on their relevance to the cluster (and, in some embodiments, auxiliary factors), and therefore their likely relevance or usefulness to image recognition algorithms. At block 635, the Ranking Component 145 determines whether additional clusters remain to be processed and sorted. If so, the method 600 returns to block 605. If not, the method ends at block 640.

Figure 7:
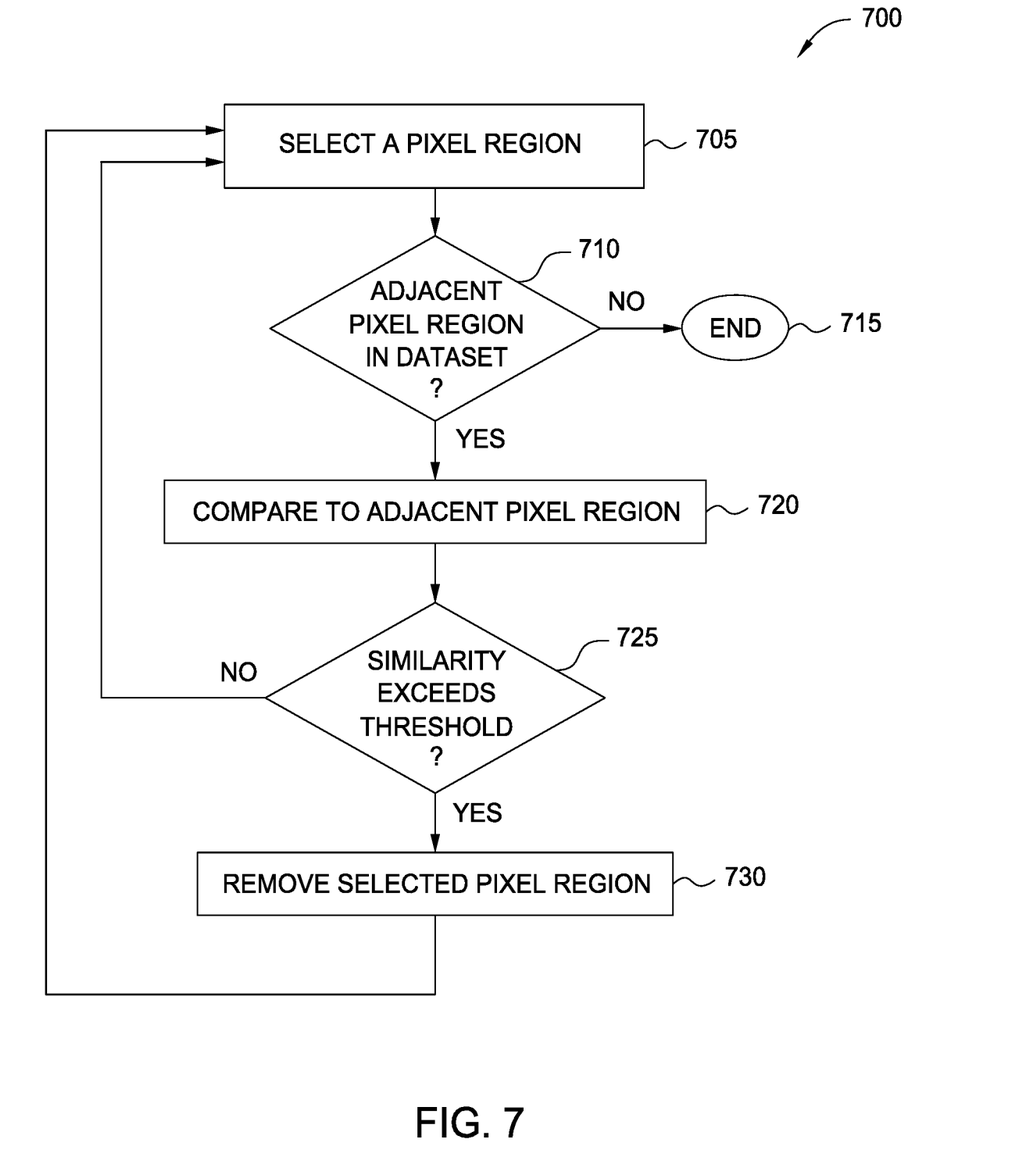
FIG. 7 is a flow diagram illustrating a method of organizing and processing images in a database, according to one embodiment disclosed herein.

FIG. 7 is a flow diagram illustrating a method 700 of organizing and processing images in a database, according to one embodiment disclosed herein. The method 700 begins at block 705, where the Pruning Component 150 selects a first pixel region in the Dataset 155. As discussed above, this selection may begin with the back of the Dataset 155 (e.g., the lowest ranked pixel region). At block 710, it is determined whether there is an adjacent pixel region in the Dataset 155. For example, in an embodiment that first selects the lowest ranked region, the Pruning Component 150 determines whether the currently selected pixel region is the highest-ranked region in the Dataset 155. If so, the method 700 ends at block 715.

If not, the Pruning Component 150 compares the selected pixel region to the adjacent region (i.e., the pixel region that is ranked just above the selected region). As discussed above, this comparison may take the form of a facial recognition matching or test, a comparison of the generated feature vectors, and the like. The method 700 then proceeds to block 725, where the Pruning Component 150 determines whether the determined similarity exceeds a predefined threshold. If so, the method 700 continues to block 730, where the selected region is pruned. That is, the lower-ranked of the two pixel regions is removed from the Dataset 155. The method 700 then returns to block 705 to select the next pixel region (e.g., the adjacent pixel region). If the similarity does not exceed the predefined threshold, the method 700 returns to block 705 without pruning the selected region.

Figure 8:
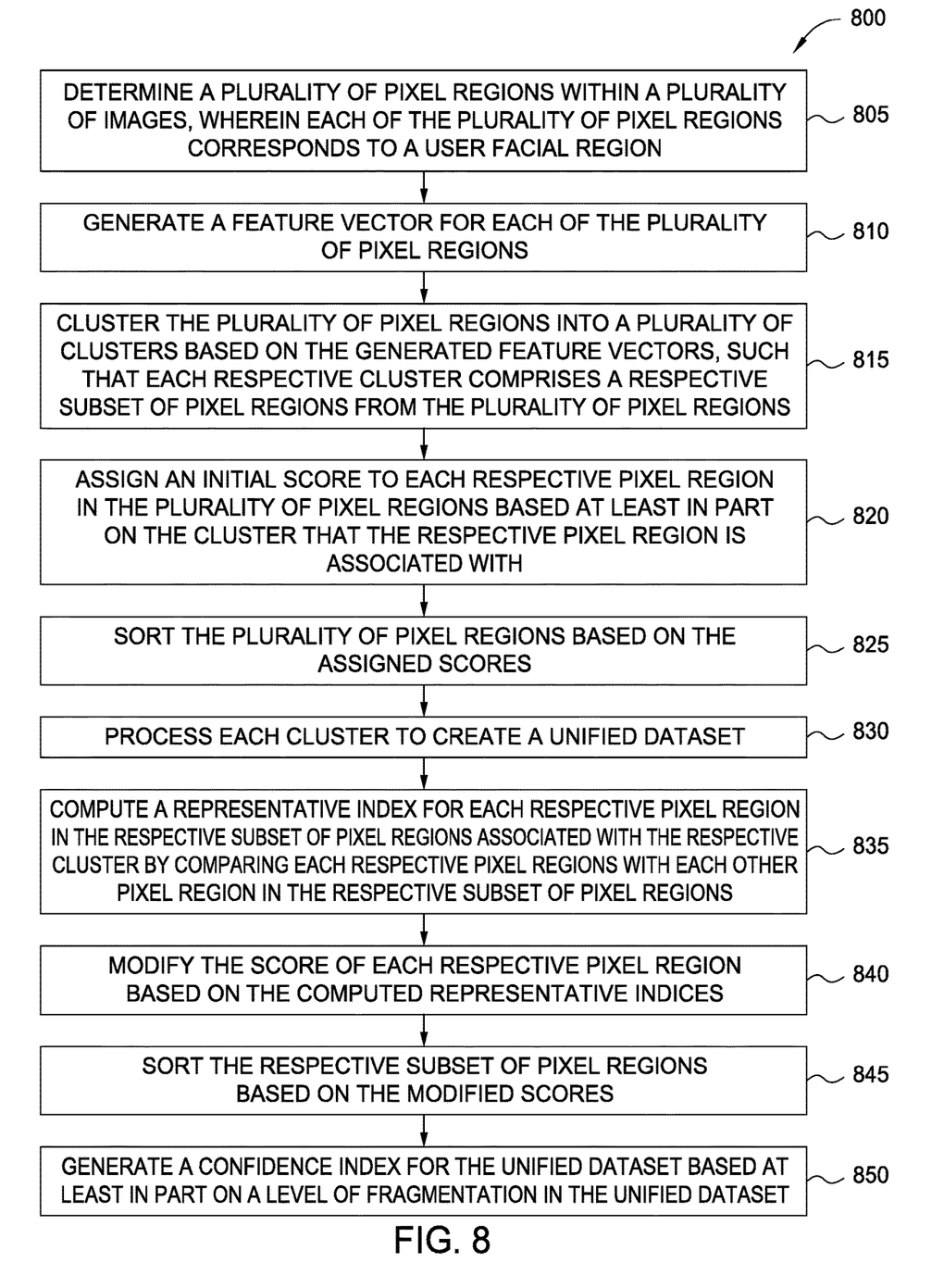
FIG. 8 is a flow diagram illustrating a method of organizing and processing images in a database, according to one embodiment disclosed herein.

FIG. 8 is a flow diagram illustrating a method 800 of organizing and processing images in a database, according to one embodiment disclosed herein. The method 800 begins at block 805, where the Feature Extractor 135 determines a plurality of pixel regions within a plurality of images, wherein each of the plurality of pixel regions corresponds to a user facial region. Additionally, at block 810, the Feature Extractor 135 generates a feature vector for each of the plurality of pixel regions. At block 815, the Clustering Component 140 clusters the plurality of pixel regions into a plurality of clusters based on the generated feature vectors, such that each respective cluster comprises a respective subset of pixel regions from the plurality of pixel regions. Next, at block 820, the Ranking Component 145 assigns an initial score to each respective pixel region in the plurality of pixel regions based at least in part on the cluster that the respective pixel region is associated with, and sorts the plurality of pixel regions based on the assigned scores.

At block 830, the Ranking Component 145 processes each cluster to create a unified dataset. In the illustrated method 800, this involves execution of blocks 835, 840, and 845. At block 835, the Ranking Component 145 computes a representative index for each respective pixel region in the respective subset of pixel regions associated with the respective cluster by comparing each respective pixel regions with each other pixel region in the respective subset of pixel regions. At block 840, the Ranking Component 145 modifies the score of each respective pixel region based on the computed representative indices, and at block 845, sorts the respective subset of pixel regions based on the modified scores. Finally, at block 850, the Image Processing Application 130 generates a confidence index for the unified dataset based at least in part on a level of fragmentation in the unified dataset.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., Image Processing Application 130) or related data available in the cloud. For example, the Image Processing Application 130 could execute on a computing system in the cloud and curate image datasets. In such a case, the Image Processing Application 130 could sort and prune identified pixel regions and store curated datasets or image databases at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method of processing a dataset containing a plurality of images, the method comprising:
   determining a plurality of pixel regions within a plurality of images, wherein each of the plurality of pixel regions corresponds to a user facial region;
   generating a feature vector for each of the plurality of pixel regions;
   clustering the plurality of pixel regions into a plurality of clusters based on the generated feature vectors, such that each respective cluster comprises a respective subset of pixel regions from the plurality of pixel regions;
   assigning an initial score to each respective pixel region in the plurality of pixel regions based at least in part on the cluster that the respective pixel region is associated with;
   sorting the plurality of pixel regions based on the assigned scores;
   processing each cluster to create a unified dataset by, for each respective cluster in the plurality of clusters:
      computing a representative index for each respective pixel region in the respective subset of pixel regions associated with the respective cluster by comparing each respective pixel regions with each other pixel region in the respective subset of pixel regions;
      modifying the score of each respective pixel region based on the computed representative indices; and
      sorting the respective subset of pixel regions based on the modified scores; and
   generating a confidence index for the unified dataset based at least in part on a level of fragmentation in the unified dataset.

2. The method of claim 1, the method further comprising:
   determining that a first image in the plurality of images is duplicative of a second image in the plurality of images based on comparing the generated feature vectors of each of the plurality of pixel regions, wherein the first and second images are not identical; and
   removing the first image from the dataset.

3. The method of claim 1, the method further comprising:
   determining a first image in the plurality of images does not include a pixel regions corresponding to a user facial reason; and
   removing the first image from the dataset.

4. The method of claim 1, the method further comprising:
   prior to assigning the initial scores, determining that a first cluster in the plurality of clusters should be merged with a second cluster in the plurality of clusters based on comparing the subset of pixel regions associated with the first cluster and the subset of pixel regions associated with the second cluster; and
   merging the first and second clusters into a single cluster.

5. The method of claim 4, wherein comparing the subset of pixel regions associated with the first cluster and the subset of pixel regions associated with the second cluster comprises, for each respective pixel region in the subset of pixel regions associated with the first cluster:
   generating a comparative index for the respective pixel region by comparing the respective pixel region with each pixel region in the subset of pixel region associated with the second cluster; and
   determining that at least one of the generated comparative indices exceeds a predefined threshold.

6. The method of claim 1, wherein the initial score for each respective pixel region in the plurality of pixel regions is based on a size of the subset of pixel regions associated with the cluster to which the respective pixel region belongs.

7. The method of claim 1, wherein modifying the score of each respective pixel regions is further based at least one of:
   pixel region orientation;
   resolution; or
   blurriness.

8. The method of claim 1, the method further comprising, after creating the unified dataset, reducing a size of the unified dataset by, for each respective cluster:
for each respective pixel region in the subset of pixel regions associated with the respective cluster:
generating a comparative index for the respective pixel region by comparing the respective pixel region with a pixel region that is sorted immediately adjacent to the respective pixel region; and
upon determining that the comparative index exceeds a predefined threshold, removing the respective pixel region from the dataset.

9. The method of claim 1, the method further comprising:
after creating the unified dataset, determining that a first pixel region in the plurality of pixel regions is also present in a different unified dataset, wherein each unified dataset is associated with a particular individual;
adjusting the score of the first pixel region; and
sorting the plurality of pixel regions associated with the first dataset based on the adjusted score.

10. The method of claim 1, wherein the confidence index for the unified dataset is further based on a ratio between a number of pixel regions in a largest cluster in the unified dataset and a total number of pixel regions in the unified dataset.

11. A computer program product for processing a dataset containing a plurality of images, the computer program product comprising:
a non-transitory computer-readable storage medium having computer-readable program code embodied therewith, the computer-readable program code executable by one or more computer processors to perform an operation comprising:
determining a plurality of pixel regions within a plurality of images, wherein each of the plurality of pixel regions corresponds to a user facial region;
generating a feature vector for each of the plurality of pixel regions;
clustering the plurality of pixel regions into a plurality of clusters based on the generated feature vectors, such that each respective cluster comprises a respective subset of pixel regions from the plurality of pixel regions;
assigning an initial score to each respective pixel region in the plurality of pixel regions based at least in part on the cluster that the respective pixel region is associated with;
sorting the plurality of pixel regions based on the assigned scores;
processing each cluster to create a unified dataset by, for each respective cluster in the plurality of clusters:
computing a representative index for each respective pixel region in the respective subset of pixel regions associated with the respective cluster by comparing each respective pixel regions with each other pixel region in the respective subset of pixel regions;
modifying the score of each respective pixel region based on the computed representative indices; and
sorting the respective subset of pixel regions based on the modified scores; and
generating a confidence index for the unified dataset based at least in part on a level of fragmentation in the unified dataset.

12. The computer program product of claim 11, the operation further comprising:
determining that a first image in the plurality of images is duplicative of a second image in the plurality of images based on comparing the generated feature vectors of each of the plurality of pixel regions, wherein the first and second images are not identical; and
removing the first image from the dataset.

13. The computer program product of claim 11, the operation further comprising:
prior to assigning the initial scores, determining that a first cluster in the plurality of clusters should be merged with a second cluster in the plurality of clusters based on comparing the subset of pixel regions associated with the first cluster and the subset of pixel regions associated with the second cluster, wherein determining that the first and second clusters should be merged comprises:
generating a comparative index for the respective pixel region by comparing the respective pixel region with each pixel region in the subset of pixel region associated with the second cluster; and
determining that at least one of the generated comparative indices exceeds a predefined threshold; and
merging the first and second clusters into a single cluster.

14. The computer program product of claim 11, the operation further comprising, after creating the unified dataset, reducing a size of the unified dataset by, for each respective cluster:
for each respective pixel region in the subset of pixel regions associated with the respective cluster:
generating a comparative index for the respective pixel region by comparing the respective pixel region with a pixel region that is sorted immediately adjacent to the respective pixel region; and
upon determining that the comparative index exceeds a predefined threshold, removing the respective pixel region from the dataset.

15. The computer program product of claim 11, the operation further comprising:
after creating the unified dataset, determining that a first pixel region in the plurality of pixel regions is also present in a different unified dataset, wherein each unified dataset is associated with a particular individual;
adjusting the score of the first pixel region; and
sorting the plurality of pixel regions associated with the first dataset based on the adjusted score.

16. A system comprising:
a processor; and
a memory storing one or more instructions which, when executed by the processor, performs an operation for processing a dataset containing a plurality of images, the operation comprising:
determining a plurality of pixel regions within a plurality of images, wherein each of the plurality of pixel regions corresponds to a user facial region;
generating a feature vector for each of the plurality of pixel regions;
clustering the plurality of pixel regions into a plurality of clusters based on the generated feature vectors, such that each respective cluster comprises a respective subset of pixel regions from the plurality of pixel regions;
assigning an initial score to each respective pixel region in the plurality of pixel regions based at least in part on the cluster that the respective pixel region is associated with;

sorting the plurality of pixel regions based on the assigned scores;

processing each cluster to create a unified dataset by, for each respective cluster in the plurality of clusters:

computing a representative index for each respective pixel region in the respective subset of pixel regions associated with the respective cluster by comparing each respective pixel regions with each other pixel region in the respective subset of pixel regions;

modifying the score of each respective pixel region based on the computed representative indices; and sorting the respective subset of pixel regions based on the modified scores; and generating a confidence index for the unified dataset based at least in part on a level of fragmentation in the unified dataset.

17. The system of claim 16, the operation further comprising:

determining that a first image in the plurality of images is duplicative of a second image in the plurality of images based on comparing the generated feature vectors of each of the plurality of pixel regions, wherein the first and second images are not identical; and removing the first image from the dataset.

18. The system of claim 16, the operation further comprising:

prior to assigning the initial scores, determining that a first cluster in the plurality of clusters should be merged with a second cluster in the plurality of clusters based on comparing the subset of pixel regions associated with the first cluster and the subset of pixel regions associated with the second cluster, wherein determining that the first and second clusters should be merged comprises:

generating a comparative index for the respective pixel region by comparing the respective pixel region with each pixel region in the subset of pixel region associated with the second cluster; and determining that at least one of the generated comparative indices exceeds a predefined threshold; and merging the first and second clusters into a single cluster.

19. The system of claim 16, the operation further comprising, after creating the unified dataset, reducing a size of the unified dataset by, for each respective cluster:

for each respective pixel region in the subset of pixel regions associated with the respective cluster:

generating a comparative index for the respective pixel region by comparing the respective pixel region with a pixel region that is sorted immediately adjacent to the respective pixel region; and upon determining that the comparative index exceeds a predefined threshold, removing the respective pixel region from the dataset.

20. The system of claim 16, the operation further comprising:

after creating the unified dataset, determining that a first pixel region in the plurality of pixel regions is also present in a different unified dataset, wherein each unified dataset is associated with a particular individual;

adjusting the score of the first pixel region; and sorting the plurality of pixel regions associated with the first dataset based on the adjusted score.

* * * * *